US007644124B1

(12) United States Patent
Porter

(10) Patent No.: US 7,644,124 B1
(45) Date of Patent: Jan. 5, 2010

(54) PRIVACY ENHANCED METHODS AND APPARATUSES FOR CONDUCTING ELECTRONIC COMMUNICATIONS

(76) Inventor: Swain W. Porter, 12511 89th Ct. NE., Kirkland, WA (US) 98034

( * ) Notice: Subject to any disclaimer, the term of this patent is extended or adjusted under 35 U.S.C. 154(b) by 0 days.

(21) Appl. No.: 09/504,236

(22) Filed: Feb. 15, 2000

(51) Int. Cl.
   *G06F 15/16* (2006.01)
(52) U.S. Cl. .................... 709/206; 709/207; 709/203
(58) Field of Classification Search ......... 709/223, 709/206, 207, 220, 222, 219, 217, 203
See application file for complete search history.

(56) References Cited

U.S. PATENT DOCUMENTS

| | | | | |
|---|---|---|---|---|
| 5,479,408 A | * | 12/1995 | Will | 370/313 |
| 5,758,354 A | * | 5/1998 | Huang et al. | 707/201 |
| 5,790,785 A | * | 8/1998 | Klug et al. | 713/202 |
| 5,822,526 A | * | 10/1998 | Waskiewicz | 709/206 |
| 5,923,845 A | * | 7/1999 | Kamiya et al. | 709/206 |
| 5,930,479 A | * | 7/1999 | Hall | 709/238 |
| 5,961,593 A | * | 10/1999 | Gabber et al. | 709/219 |
| 5,987,508 A | * | 11/1999 | Agraharam et al. | 709/217 |
| 6,023,723 A | * | 2/2000 | McCormick et al. | 709/206 |
| 6,052,709 A | * | 4/2000 | Paul | 709/202 |
| 6,085,231 A | * | 7/2000 | Agraharam et al. | 709/206 |
| 6,097,797 A | * | 8/2000 | Oseto | 379/100.08 |
| 6,108,691 A | * | 8/2000 | Lee et al. | 709/206 |
| 6,161,129 A | * | 12/2000 | Rochkind | 709/206 |
| 6,192,380 B1 | * | 2/2001 | Light et al. | 715/505 |
| 6,195,686 B1 | * | 2/2001 | Moon et al. | 709/206 |
| 6,205,330 B1 | * | 3/2001 | Winbladh | 455/426.1 |
| 6,249,805 B1 | * | 6/2001 | Fleming, III | 709/206 |
| 6,266,690 B1 | * | 7/2001 | Shankarappa et al. | 709/202 |

(Continued)

OTHER PUBLICATIONS

Oppliger, R., "Privacy protection and anonymity services for the World Wide Web (WWW)," Future Generations Computer Systems, Elsevier Science Publishers, Amsterdam, NL, vol. 16, No. 4, Feb. 2000, pp. 379-391, XP004185850.

(Continued)

*Primary Examiner*—William C Vaughn, Jr.
*Assistant Examiner*—Kristie D Shingles
(74) *Attorney, Agent, or Firm*—Schwabe, Williamson & Wyatt, P.C.

(57) ABSTRACT

A computer (or device of the like), on behalf of a user, registers the user with a first web site. The computer provides a first email address for use to register the user with said first web site. The computer, on behalf of the user, registers the user with a second web site. The computer provides a second email address, separate and distinct from the first email address, for use to register said user with said second web site. In alternate embodiments, the computer, in like manner, facilitates designations of first and second email addresses for use to electronically communicate with first and second intended communication partners. Co-related, an email service provider receives emails for the first and second email addresses of the user, and organize the received emails by at least the email addresses, and by intended versus non-intended CP/GCP of the email addresses. The email service provider provides these received emails to the computer used the user, with the emails so characterized accordingly. The computer presents these emails for viewing by the user, including in one embodiment, facilitation of deletion of all emails addressed to an email address received from senders other than the intended CP/GCP, via a single press of a key/control button.

60 Claims, 9 Drawing Sheets

Request Email Address from EmailServiceProvider.Net

Please list email address of each intended partner/partners of this email address:

Partner1    [404]

Partner2    [404]

Partner3    [404]

Etc.

(Submit)

U.S. PATENT DOCUMENTS

| | | | |
|---|---|---|---|
| 6,314,439 B1 * | 11/2001 | Bates et al. | 715/513 |
| 6,353,852 B1 * | 3/2002 | Nestoriak et al. | 709/206 |
| 6,356,937 B1 * | 3/2002 | Montville et al. | 709/206 |
| 6,360,254 B1 * | 3/2002 | Linden et al. | 709/219 |
| 6,366,950 B1 * | 4/2002 | Scheussler et al. | 709/206 |
| 6,389,455 B1 * | 5/2002 | Fuisz | 709/206 |
| 6,396,513 B1 * | 5/2002 | Helfman et al. | 715/752 |
| 6,487,584 B1 * | 11/2002 | Bunney | 709/206 |
| 6,496,855 B1 * | 12/2002 | Hunt et al. | 709/217 |
| 6,574,658 B1 * | 6/2003 | Gabber et al. | 709/206 |
| 6,591,291 B1 * | 7/2003 | Gabber et al. | 709/206 |
| 6,615,241 B1 * | 9/2003 | Miller et al. | 709/206 |
| 6,643,685 B1 * | 11/2003 | Millard | 709/206 |
| 6,654,779 B1 * | 11/2003 | Tsuei | 718/101 |
| 6,725,269 B1 * | 4/2004 | Megiddo | 709/228 |
| 6,775,828 B2 * | 8/2004 | Feinleib et al. | 717/173 |
| 6,874,023 B1 * | 3/2005 | Pennell et al. | 709/224 |
| 6,965,918 B1 * | 11/2005 | Arnold et al. | 709/206 |
| 7,120,927 B1 * | 10/2006 | Beyda et al. | 726/2 |
| 7,136,901 B2 * | 11/2006 | Chung et al. | 709/206 |
| 2001/0009015 A1 * | 7/2001 | Mousseau et al. | 709/206 |
| 2005/0188046 A1 * | 8/2005 | Hickman et al. | 709/206 |

OTHER PUBLICATIONS

Claessens, J. et al., "Solutions for anonymous communication on the Internet," Proceddings IEEE 33rd Annual 1999 International Carnahan Conference on Security Technology (Cat. No. 99CH36303), Proceedings IEEE 33rd Annual 1999 International Carnahan Conference on Security Technology, Madrid, Spain, Oct. 5-7, 1999, pp. 298-303, XP002182124, 1999, Piscataway, NJ, USA, IEEE, USA.

* cited by examiner

In response to a first need for a separate and distinct email address, client computer provides users with first such email address

202

In response to a second need for a separate and distinct email address, client computer provides users with second such email address

204

Registration with BuyWidget.com

Name

Address

City/State

Zip

Email Address    402

Submit

Figure 4a

Request Email Address from EmailServiceProvider.Net

Please list email address of each intended partner/partners of this email address:

Partner1    404

Partner2    404

Partner3    404

Etc.

Submit

Figure 4b

| Email Addresses of A User All Hosted by "postoffice.mailservice.net" | Email Addresses of Intended Partners |
|---|---|
| XYZ001     502 | BuyWidget.com     504 |
| XYZ002     502 | TravelService.com     504 |
| XYZ003     502 | Myspouse@www.xyz.com     504 |
| XYZ004     502 | Mybestfriend1@www.abc.com<br>Mybestfriend2@www.def.com<br>Etc. etc.     504 |
| Etc | Etc |
| | |
| | |

Figure 5

PRIVACY ENHANCED METHODS AND APPARATUSES FOR CONDUCTING ELECTRONIC COMMUNICATIONS

BACKGROUND OF THE INVENTION

1. Field of the Invention

The present invention relates to the field of information systems. More specifically, the present invention relates to electronic communications and privacy.

2. Background Information

Advances in computer technology have led to personalization of computers. Once reserved for large enterprises, computers have become affordable and available to the masses. Coupled that with advances in networking and telecommunication technologies, increasingly computers are being networked together. Companies are racing to put their businesses on public data networks, such as the Internet. Other non-profit and government entities are doing the same. Information has become readily available with a few mouse clicks. As a result, increasingly users go on-line to electronically communicate with each other through emails, get their news, do their shopping, meet their friends or simply other users on-line.

Currently, under the prior art, a more sophisticated user may have as many as a handful of email addresses, a work related email address hosted by the IT establishment of the user's employer, a personal email address hosted by the user's Internet access provider (as part of the "access service"), and one or more personal email addresses hosted by the free email services, such as Hotmail.com, Yahoo mail, and the like (to attract the user to visit the site). The user might use the work related email address for work related communication only, and the other email addresses for personal communications, thereby segregating the personal communications from the scrutiny of the employer. The user might further use the personal email address hosted by the access provider for personal communications with certain group of users, such as friends and family members, while using the personal email addresses hosted by the free email service providers for general communication with other users/establishments of no particular relationship, including content and service providers, e-commerce sites, and the like.

Like its brethren of the earlier era, the "snail" mail, to many users, one of the most annoying aspects of this modern world of electronic communications is the receipt of unsolicited emails, often referred to as SPAM mails. The problem is further compounded by the fact that many Internet access, content, and service providers, e-commerce sites and the like (hereinafter, simply web sites or web site operators) routinely sell their email lists to other parties of interest. When viewing an "in-box", there is no easy way to distinguish between the legitimate mails from the illegitimate mails. The problem is even worse, if the user consolidates all his/her emails of the various email accounts into a single "in-box" (for ease-of-use).

Thus, a more user friendly, in particular, a more private approach to conducting electronic communications is desired.

SUMMARY OF THE INVENTION

A computer (or device of the like), on behalf of a user, registers the user with a first web site. The computer provides a first email address for use to register the user with said first web site. The computer, on behalf of the user, registers the user with a second web site. The computer provides a second email address, separate and distinct from the first email address, for use to register said user with said second web site.

In alternate embodiments, the computer, in like manner, facilitates designations of first and second email addresses for use to electronically communicate with first and second intended communication partners.

Co-related, an email service provider receives emails for the first and second email addresses of the user, and organizes the received emails by at least the email addresses, and by intended versus non-intended CP/GCP of the email addresses. The email service provider provides these received emails to the computer used by the user, with the emails so characterized accordingly.

The computer presents these emails for viewing by the user, including in one embodiment, facilitation of deletion of all emails addressed to an email address received from senders other than the intended CP/GCP, via a single press of a key/control button.

BRIEF DESCRIPTION OF DRAWINGS

The present invention will be described by way of exemplary embodiments, but not limitations, illustrated in the accompanying drawings in which like references denote similar elements, and in which:

FIGS. 4a-4b illustrate two end user interfaces associated with the operation of the present invention;

FIG. 5 illustrates correspondence between email addresses and intended communication partners, in accordance with one embodiment;

DETAILED DESCRIPTION OF THE INVENTION

In the following description, various aspects of the present invention will be described. However, it will be apparent to those skilled in the art that the present invention may be practiced with only some or all aspects of the present invention. For purposes of explanation, specific numbers, materials and configurations are set forth in order to provide a thorough understanding of the present invention. However, it will also be apparent to one skilled in the art that the present invention may be practiced without the specific details. In other instances, well known features are omitted or simplified in order not to obscure the present invention.

Parts of the description will be presented using terms such as scripts, applet, end-user interfaces, icons, and so forth, commonly employed by those skilled in the art to convey the substance of their work to others skilled in the art. Parts of the description will be presented in terms of operations performed by a computer system, using terms such as registering, notifying, sending, and so forth. As well understood by those skilled in the art, these quantities and operations take the form of electrical, magnetic, or optical signals capable of being stored, transferred, combined, and otherwise manipulated through mechanical and electrical components of a digital system; and the term digital system include general purpose as well as special purpose data processing machines, systems, and the like, that are standalone, adjunct or embedded.

Various operations will be described as multiple discrete steps performed in turn in a manner that is most helpful in understanding the present invention, however, the order of description should not be construed as to imply that these operations are necessarily order dependent, in particular, the order the steps are presented. Furthermore, the phrase "in one embodiment" will be used repeatedly, however the phrase does not necessarily refer to the same embodiment, although it may.

Figure 1:
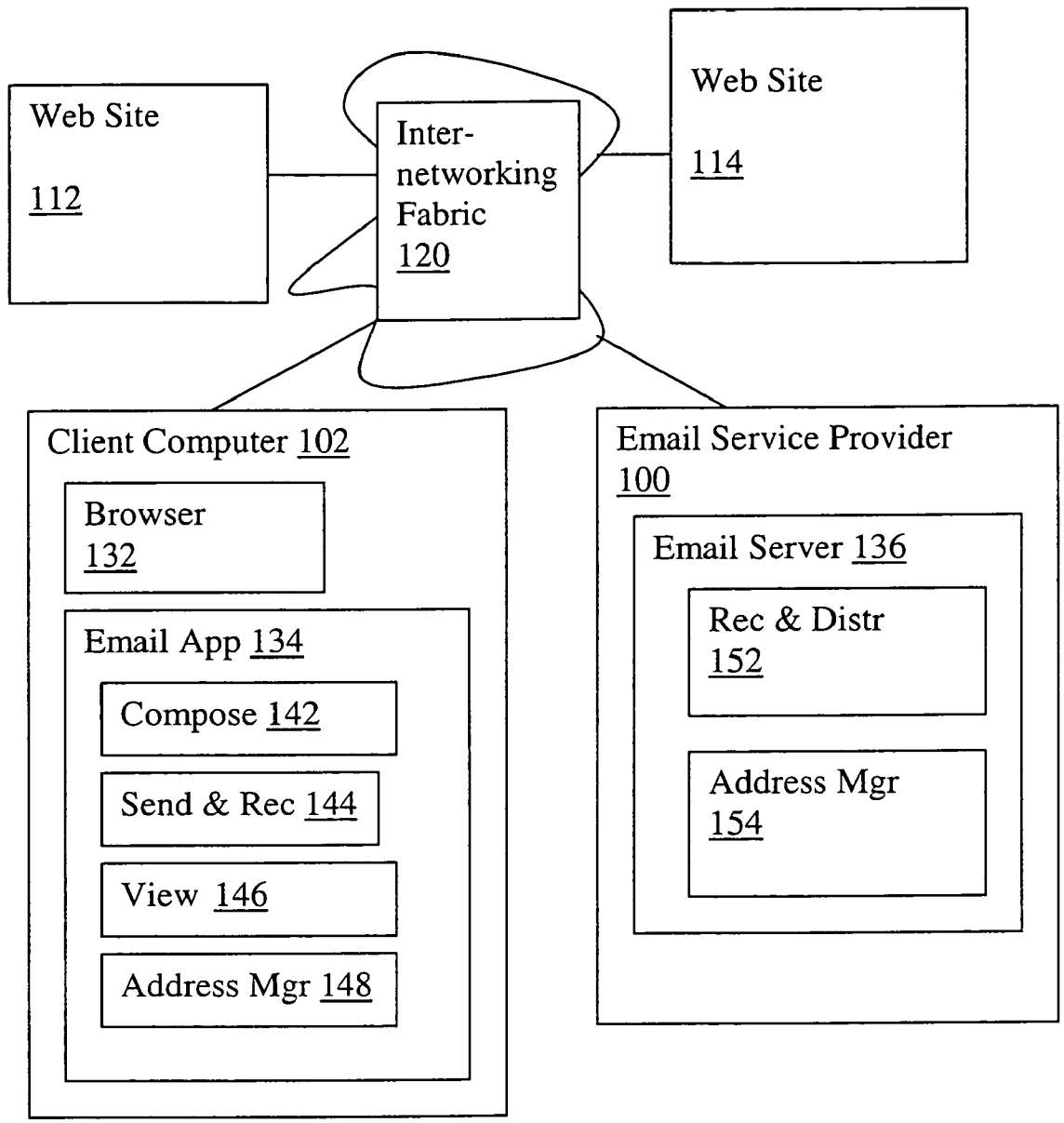
FIG. 1 illustrates an overview of the present invention, in accordance with one embodiment.

Referring now to FIG. 1, wherein a block diagram illustrating an overview of the present invention in accordance with one embodiment is shown. As illustrated, client computer 102, web sites 112 and 114, and email service provider 100 are coupled to one another through internetworking fabric 120. In accordance with the present invention, a user of client computer 102 uses the email service provided by email service provider 100 to enhance the privacy of its electronic communications with web sites 112 and 114. The enhancements incorporated into client computer 102 and email service provider 100 to make possible the desired enhanced privacy will now be described in turn.

As illustrated, client computer 102 is equipped with browser 132 and enhanced email application 134, which includes enhanced viewing function 144 and address manager 146, in addition to conventional functions, such as compose function 142, and send and receive function 144. A user of client computer 102 uses browser 132 to visit, commerce or otherwise interact with web sites 112 and 114. The nature of the interaction is a type that calls for the provision of an email address by the user of client computer 102 for web site 112/114 to send from time to time emails to user. As will be described in more detail below, the user of client computer 102 advantageously uses the enhanced functions provided to email application 134 (address manager 148 in particular) to provide separate and distinct email addresses to web sites 112 and 114. For the illustrated embodiment, the email addresses are hosted by email service provider 100 (more specifically, address manager 154 of email server 136). Further email service provider 100 includes enhanced functions (in cooperation with the enhanced functions of email application 134) in facilitating the user of client computer 102 in quickly discerning whether the received emails are from web sites 112 and 114 or not (i.e. the intended communication partners of the email addresses), as well as quickly disposing (if so desired) received emails from senders other than web sites 112 and 114 (e.g. a purchaser of the mail list of web site 112/114). In one embodiment, the quick discernment and quick disposition is made possible by an automatic categorization feature provided by email service provider 100 (more specifically, receive and distribution manager 152 of email server 136).

Client computer 102 is intended to represent a broad range of computing devices and the like known in the art. Examples of client computer 102 include, but not limited to, desktop computers, laptop computers, palm-sized computing devices (also referred as personal digital assistants), enhanced wireless telephones with computing capabilities, set-top boxes and the like, such as those available from Hewlett Packard, Inc. of Palo Alto, Calif., Nokia of Finland, Sony Corporation of N.J. Similarly, browser 132 is intended to represent a broad range of browsers known in the art, such as the Navigator from Netscape Communication of Mountain View, Calif., and Internet Explorer from Microsoft of Redmond, Wash. Furthermore, as will be apparent from the descriptions to follow, the target of the "interaction" may be communication partners other than web sites (e.g. friends and family members of the user of client computer 102), and the "interaction" may be conducted through other non-browser type applications (e.g. through email application 134). Likewise, except for the teachings of the present invention incorporated with email application 134, email application 134 is also otherwise intended to represent a broad range of email applications known in the art, including, but not limited to, Outlook Express available from Microsoft Corporation of Redmond, Wash., Lotus Notes available from IBM of Armonk, N.Y., and so forth.

Still referring to FIG. 1, web sites 112 and 114 are intended to represent a broad range of access, content as well as service providers, and the like, known in the art. As alluded to earlier, in alternate embodiments, web sites 112 and 114 may actually be "non web server" type communication partners, to be described more fully below. In any event, web sites 112 and 114 are intended to represent at least (but not limited to) sites such as a merchandising site like Buy.com, a portal like Yahoo.com, a content provider site like MP3.com, an auction site like eBay.com, a service provider site like Expedia.com, and so forth.

Email service provider 100 may be a dedicated email service provider or may also offer other types of services or contents. That is, the privacy enhanced email service may be provided as an integral part of content provision, access service, or services of other kinds. The privacy enhanced email service may be provided by a single or a cluster of servers interconnected via local or wide area networking. Suitable computer servers include but not limited to those available from IBM of Armonk, N.Y., and Sun Microsystems of Mountain View, Calif.

Internetworking fabric 120 is intended to represent a broad range of public and private data networks constituted with hubs, routers, switches, gateways and the like, known in the art. Suitable networking equipment (i.e. hubs, routers, and so forth) includes but not limited to those available from CISCO Systems and 3COM, both of San Jose, Calif. In one embodiment, network 120 is the well known Internet. Thus, the communication links between network 120 and web sites 112-114, client computer 102 and email service provider 100 may be any one of a number of communication links known in the art, including but not limited to modem connections, digital subscriber lines (DSL), Integrated Service Digital Network (ISDN), cable modem, asynchronous transfer mode (ATM), frame relay and so forth.

Before further describing the present invention, it should be noted that the terms "friends" and "family members" as used herein are intended to be broadly defined. No minimal friendship or familial relationship threshold must be satisfied before an intended communication partner can be considered a "friend" or "family member".

Figure 2:
FIG. 2 illustrates a method of the present invention in accordance with one embodiment.

Having now given an overview of the present invention, in particular the network environment, FIG. 2 illustrates a method of operation of the present invention, in accordance with one embodiment. As illustrated, at 202, in response to a first need to provide a first intended communication partner (e.g. earlier described web site 112/114, or simply a friend/family member, or a group of friends/family members of the user of client computer 102), client computer 102 provides user with a first email address hosted by email service provider 100 for use by the user to provide to the first intended communication partner. At 204, in response to a second need to provide a second intended communication partner (again, the partner may be web site 112/114, a friend/family member, or a group of friends/family members of the user of client computer 102), client computer 102 provides user with a second email address that is separate and distinct from the first email address (but preferably also hosted by email service provider 100) for use by the user to provide to the second intended communication partner.

In other words, under the present invention, client computer 102 provides the users with multiple separate and distinct email addresses (preferably hosted by the same email service provider 100) for use with respective communication partners (such as web sites) or groups of communication partners.

It is contemplated by the present invention that among the multitude of situations that give rise to the need for a email address by the user of client computer 102 is the situation where the user is registering with a web site, such as web site 112/114 (see e.g. FIG. 4*a*). Preferably, the need is automatically detected as well as automatically satisfied by address manager 148 of email application 134. The auto detection may be accomplished via any one of a number of techniques known in the art including but not limited to intercepting messages of browser 132 to determine whether a registration form including an email address field (402 of FIG. 4*a*) is to be completed. Similarly, the auto population of the email address field (402 of FIG. 4*a*) may also be accomplished via any one of a number of auto population techniques known in the art.

Another situation contemplated by the present invention that among the multitude of situations that give rise to the need for a email address by the user of client computer 102 is the situation when the user simply wants a email address for exclusive use with a friend/family member or a group of friend/family members. Such need may be explicitly communicated to address manager 148 of email application 134, after the user listing all the applicable email addresses (see e.g. FIG. 4*b*, fields 404 in particular).

Figure 3A:
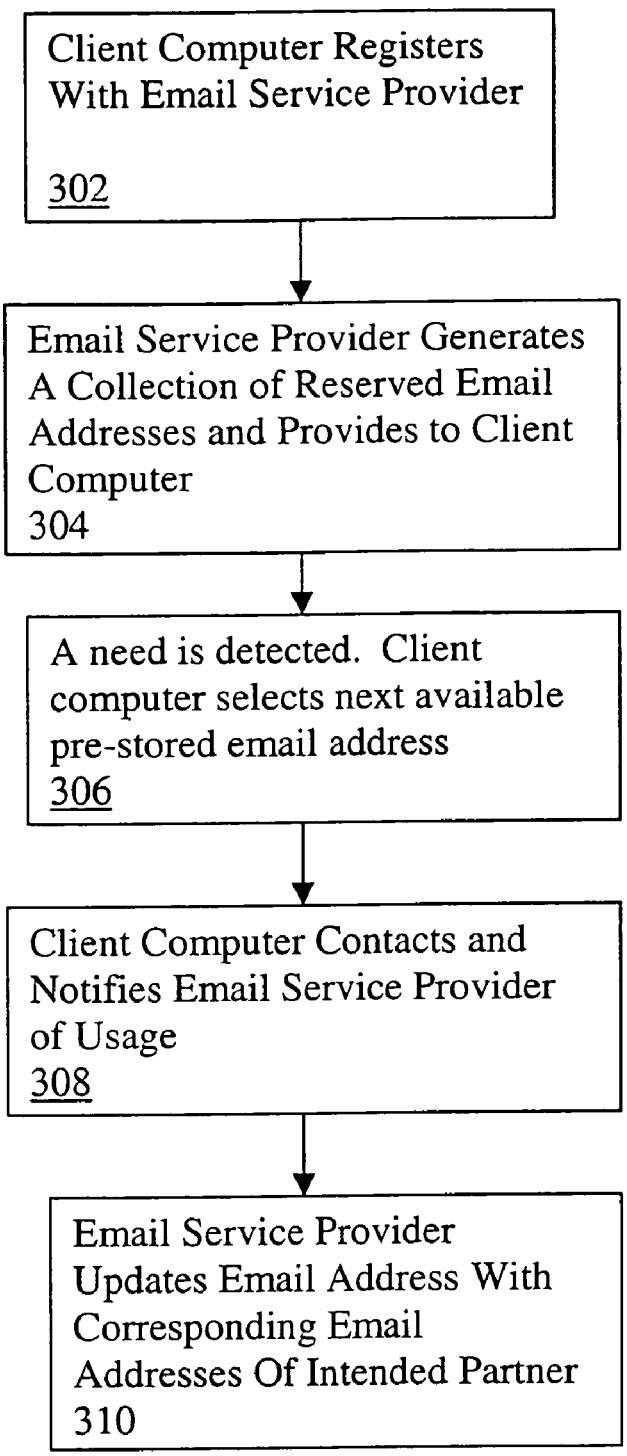
FIGS. 3a-3b illustrate the method for a client computer to provide separate and distinct email addresses for the user of the client computer, in accordance with two embodiments.

FIG. 3*a* illustrates a method for client computer 102 to provide such separate and distinct email addresses for the user of client computer 102, in accordance with one embodiment. At 302, the user of client computer 102, using email application 134, registers with email service provider 100 for the privacy enhanced email service. In response, at 304, email service provider 100 generates a collection of reserved email addresses hosted by email service provider 100, and pre-provides them to address manager 148 of email application 134. Email service provider 100 may form these separate and distinct email addresses in any one of a number of manners, e.g. by simply enumerating serial numbers and appending them to the user's identifier, such as XYZ0001@postoffice.emailservice.net, XYZ0002@postoffice.emailservice.net, and so forth (see FIG. 5, 502).

Thus, at 306, when a need for an email address is "detected", address manager 148 selects the next available pre-stored separate and distinct email addresses for use by the user of client computer 102, and records the email address of the intended communication partner or partners (i.e. web site 112/114 or a friend/family members or a group of friends/family members). The process repeats itself with each need for an email address being satisfied by a separate and distinct pre-stored email address. Periodically, at 308, address manager 148 contacts email service provider 100, and notifies email service provider 100 of the email addresses of the intended communication partner or partners of each separate and distinct email address in use. At 310, email service provider 100 updates the previously provided separate and distinct email addresses with the corresponding email addresses of the intended communication partner or partners (see also FIG. 5, 504). In alternate embodiments, the notification, as well as the update, may be made "immediately" as each separate and distinct email address is selected and used.

Figure 3B:
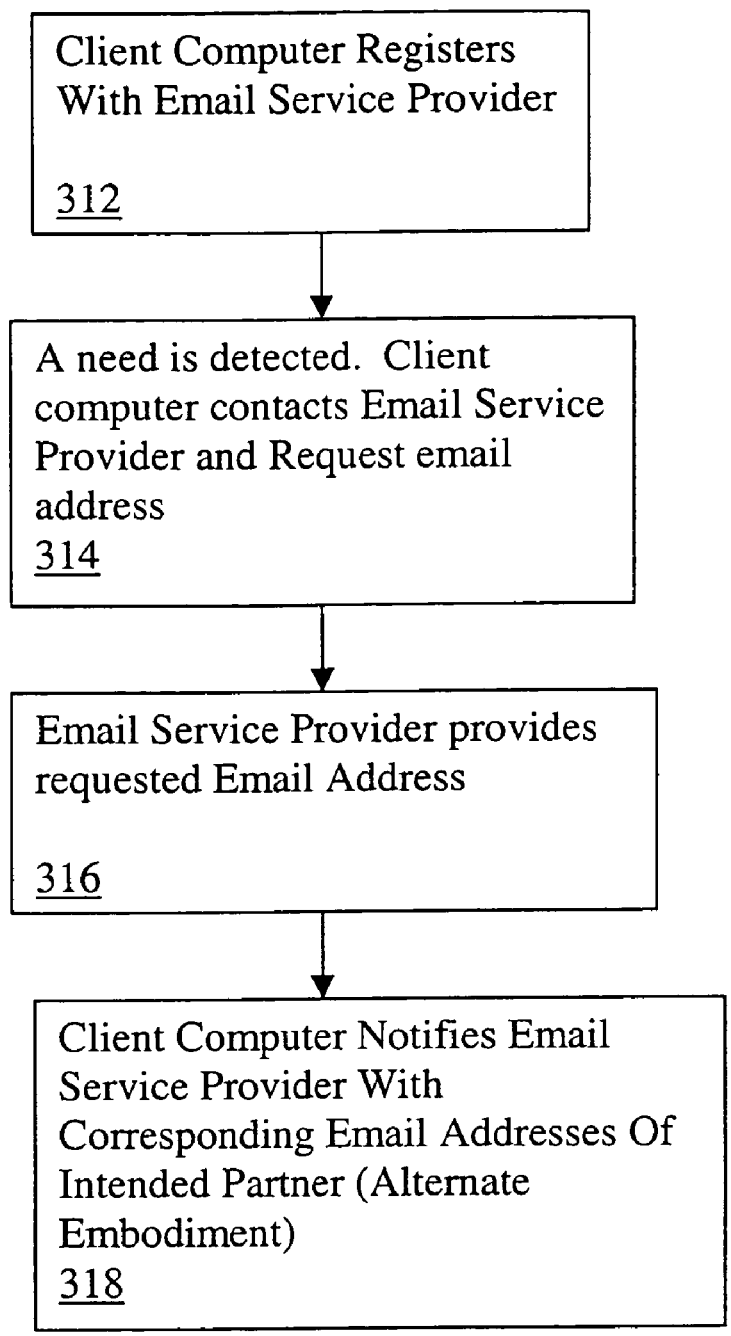

FIG. 3*b* illustrates a method for client computer 102 to provide such separate and distinct email addresses for the user of client computer 102, in accordance with another embodiment. This embodiment differs from the earlier described embodiment in that there is no pre-provision of the separate and distinct email addresses. Instead, each of the separate and distinct email address is provided to client computer 102 in real time, as it is needed.

Similar to the earlier embodiment, at 312, the user of client computer 102, using email application 134, registers with email service provider 100 for the privacy enhanced email service. At 314, when a need for an email address is "detected", address manager 148 contacts email service provider 100 and requests for assignment of a separate and distinct email address for use with the intended communication partner or partners. In one embodiment, the request integrally includes the email address or addresses of the intended communication partner or partners. In response, at 316, email service provider 100 provides client computer 102 with a separate and distinct email address for use with the intended communication partner or partners. In one embodiment, the separate and distinct email address may be generated in real time. In an alternate embodiment, email service provider 100 may select the separate and distinct email address from a cache of pre-generated separate and distinct email addresses for the user. The pre-generation e.g. may be done at registration time, and thereafter periodically.

In alternate embodiments where the email address or addresses of the intended communication partner or partners were not provided as an integral part of the request for the separate and distinct email address, the method further include an operation, where address manager 148 subsequently provides email service provider 100 with the address/addresses of the intended communication partner/partners, e.g. by way of a "confirmation" message or messages.

Regardless, in response, as the earlier described embodiment, email service provider 100 updates the separate and distinct email addresses accordingly, noting the email address/addresses of their intended communication partner/partners, 318.

Figure 6:
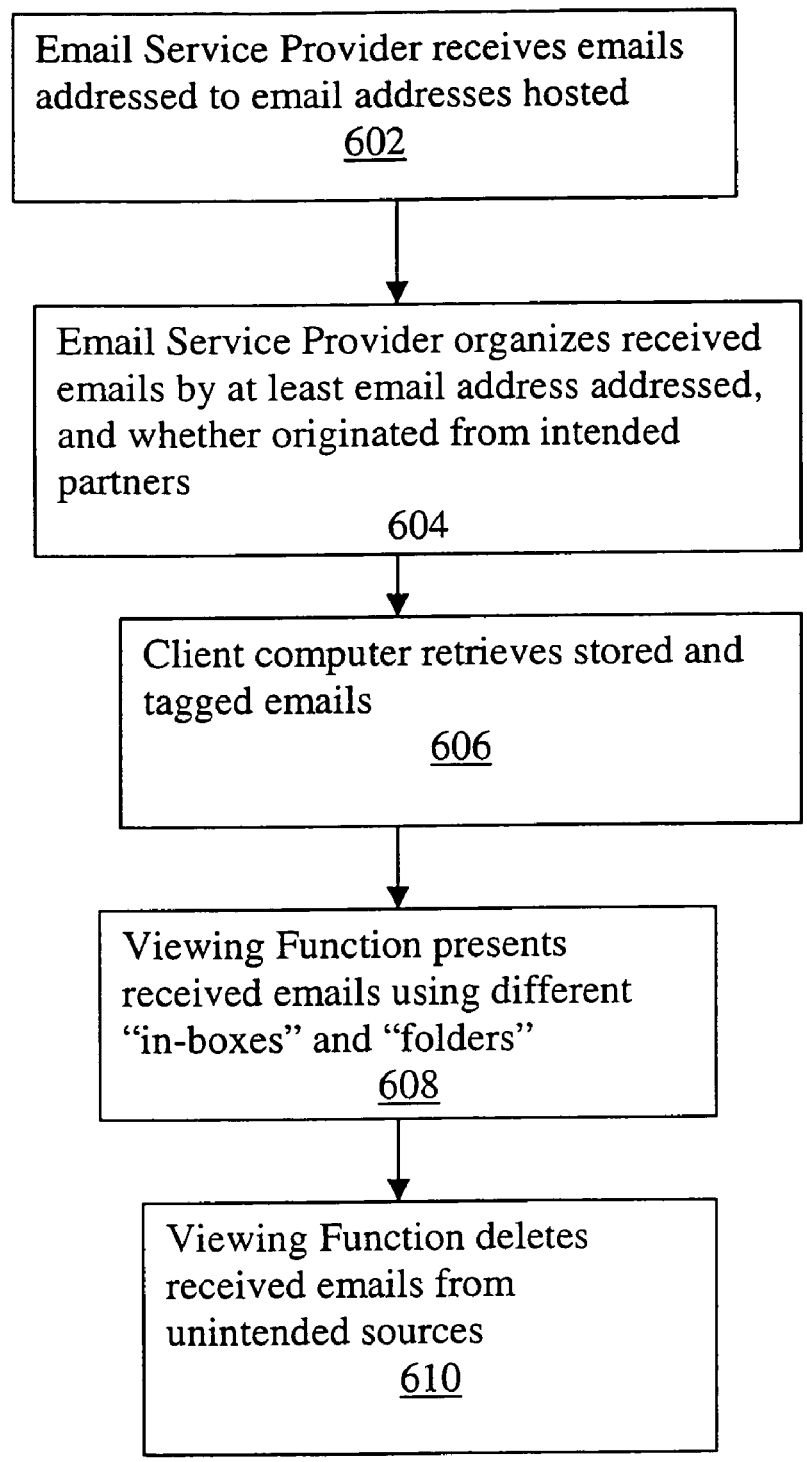
FIG. 6 illustrates a method of operation by the email service provider and the client computer to facilitate viewing of emails, in accordance with one embodiment.

FIG. 6 illustrates a method of operation by email service provider 100, and client computer 102 to facilitate viewing of emails under the present invention, in accordance with one embodiment. As illustrated, at 602, email service provider 100 receives emails addressed to email addresses hosted by provider 100 for its registered users or subscribers. At 604, email service provider 100 organizes the received emails by at least the email address addressed, and whether the emails were originated from the intended communication partner/partners or not. For the illustrated embodiment, email service provider 100 characterizes the received emails by tagging the received emails in accordance with at least the aforementioned criteria, for subsequent delivering to client computer 102. Email service provider 100 determines whether a received email was originated from an intended communication partner or not, by referencing email address correspondence information maintained (FIG. 5). All received emails addressed to an email address of a user originated from a source other than the known intended partners maintained by email service provider 100, are considered from unintended communication partners, and characterize/tag accordingly.

Figure 7:
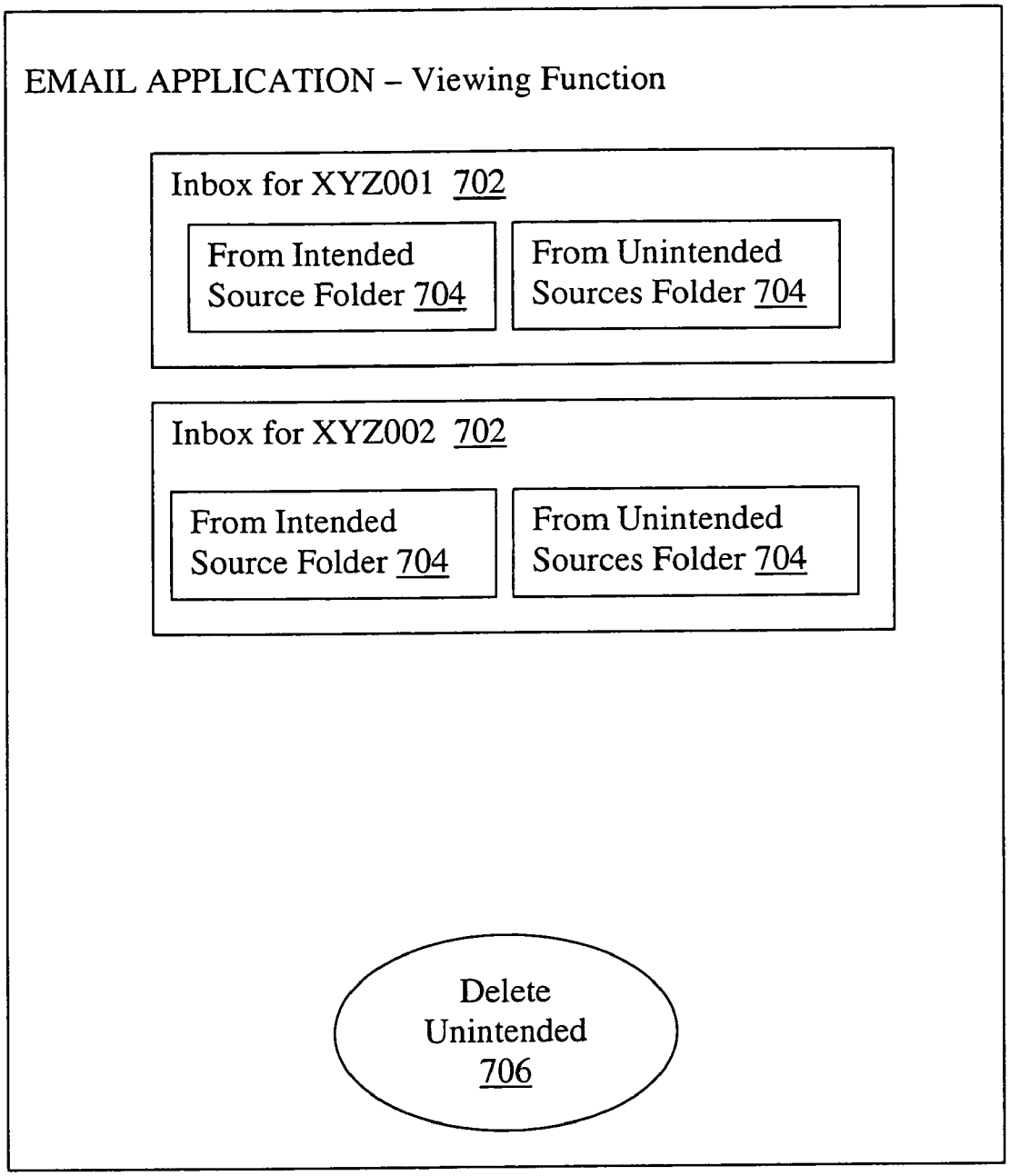
FIG. 7 illustrates an end user interface associated with the method of operation of FIG. 6, in accordance with one embodiment.

At 606, client computer 102, using email application 134, connects to email service provider 100 to retrieve the stored received emails (tagged in accordance with at least the email address addressed and whether the originators were intended communication partners of the email addresses). At 608, viewing function 146 of email application 134 presents the received emails for viewing by the user, using different "inboxes" the different email addresses, and different "folders" for the received emails originated from the intended communication partner/partners, and received emails originated from sources other than the intended partners (see e.g. elements 702-704 in FIG. 7).

At 610, in response to instruction from the user, viewing function 146 deletes all received emails addressed to an email address of the user not originated from the intended communication partner or partners. For the illustrated embodiment, viewing function 146 also presents an end user interface feature, such as a command button, to enable the user to provide the delete instruction with a single press of a key/control button (see e.g. elements 706 in FIG. 7).

Thus, it can be seen from the above description, by advantageously providing separate and distinct email addresses to a user to use to communicate with different intended communication partner or partners (such as a web site), received emails addressed to the email addresses of the user may be easily segregated, separating the emails originated from the intended partner or partners from the emails originated from other sources, thereby allowing the user to easily discern whether the intended communication partner/partners have sold or otherwise given away the user's email address. It can also be seen from the above description, the present invention advantageously allows the user to easily dispose of all the received emails from unintended sources. As a result, user experience is improved.

Accordingly, methods and apparatuses for a privacy enhanced approach to conducting electronic communications have been described. While the present invention has been described in terms of the above illustrated embodiments, those skilled in the art will recognize that the invention is not limited to the embodiments described. The present invention can be practiced with modification and alteration within the spirit and scope of the appended claims. The description is thus to be regarded as illustrative instead of restrictive on the present invention.

What is claimed is:

1. A method comprising:
a user computer providing a first email address received from an email service provider for use to register a user of the user computer with a first web site; and
the user computer providing a second email address received from the email service provider, separate and distinct from the first email address, for use to register the user with a second web site,
wherein the first and second email addresses were provided together as a collection of email addresses to the user computer by the email service provider in advance of providing the first and second email addresses to the first and second web sites by the user computer,
wherein providing the first and second email addresses by the user computer comprises selecting by the user computer the first and second email addresses from the collection of email addresses obtained by the user computer from the email service provider in advance of the selection.

2. The method of claim 1, wherein the first email address comprises a first user identifier, and the second email address comprises a second user identifier, separate and distinct from said first user identifier.

3. The method of claim 1, wherein the first email address comprises an address of the email service provider, and the second email address comprises the address of the same email service provider.

4. The method of claim 1, wherein the first email address comprises a first user identifier and an address of the email service provider, and the second email address comprises a second user identifier, separate and distinct from said first user identifier, and the address of the same email service provider.

5. The method of claim 1, wherein the method further comprises the user computer notifying the email service provider of the usage of the first and second email addresses, including addresses of the first and the second web site.

6. The method of claim 5, wherein said notifications are performed integrally as said first and second email addresses are respectively provided to said user computer for use to respectively register the user with the first and second web sites.

7. The method of claim 5, wherein said notifications are performed subsequently in batch after said first and second email addresses were provided to said user computer for use to register the user with the first and the second web sites.

8. The method of claim 1, wherein the method further comprises:
receiving emails addressed to said first and second email addresses;
organizing said received emails based at least in part on whether the emails are addressed to the first or the second email address.

9. The method of claim 8, wherein said organizing of said received emails is at least further based on whether said received emails addressed to said first or second email addresses were sent respectively by said first or second web site or not.

10. The method of claim 9, wherein the method further comprises deleting all received emails addressed to said first or second email addresses not sent respectively by said first or second web site, while preserving all undeleted emails addressed to said first or second email addresses sent respectively by said first or second web site.

11. The method of claim 10, wherein the deleting of received emails not sent by said first or second web site and preserving all undeleted emails is performed in response to an instruction of said user.

12. The method of claim 11, wherein the method further comprises providing the user with an end user interface feature to provide said deletion instruction with a single press of a key or control button.

13. The method of claim 1, wherein the web site is a content provider, a service provider or an access provider.

14. A method comprising:
an electronic device requesting and receiving for a user, a first email address from an email service provider at a first point in time subsequent to the user subscribing for email service with the email service provider;
the electronic device employing the received first email address to facilitate communication between the user and a first communication partner or group of communication partners;
the electronic device, prior to the first communication partner or group of communication partners initiating a communication with the user, notifying the email service provider of said employment of the first email address to facilitate communication with the first communication partner or group of communication partners;

the electronic device requesting and receiving for the user, a second email address, separate and distinct from said first email address, from the email service provider at a second point in time subsequent to the user subscribing for email service with the email service provider, the second point in time being a later point in time than the first point in time;

the electronic device employing the received second email address to facilitate communication between the user and a second communication partner or group of communication partners; and the electronic device, prior to the second communication partner or group of communication partners initiating a communication with the user, notifying the email service provider of said employment of the second email address to facilitate communication with the second communication partner or group of communication partners.

15. The method of claim 14, wherein said notifications are made integrally when the electronic device makes respective requests for said first and second email address from said email service provider.

16. The method of claim 14, wherein said notifications are made respectively after the electronic device have been respectively provided with said first and second email address from said email service provider.

17. A computer-implemented method comprising:
an email service provider registering a user of an electronic device, as a service subscriber of the email service provider; and
the email service provider providing together a collection of email addresses, said collection of email addresses having at least a first and a second email address, said first and second email addresses being separate and distinct and being provided by the email service provider to the electronic device for subsequent selection and use by the electronic device to facilitate communication between the user and respectively, a first and a second intended communication partner or group of communication partners;
wherein the first and second email addresses are provided together as a collection of email addresses to the user of the electronic device by the email service provider prior to the first and second intended communication partner or group of communication partners initiating communication with the user of the electronic device.

18. The method of claim 17, wherein said providing together a collection of email address comprises the email service provider providing a plurality of other distinct email addresses to the electronic device.

19. The method of claim 17, wherein the method further comprises the email service provider receiving notification of usage of said first email address with said first communication partner or group of communication partners, from the electronic device used by the user, and prior to the first communication partner or group of communication partners initiating a communication with the user.

20. The method of claim 17, wherein the method further comprises the email service provider receiving notification of usage of said second email addresses with said second communication partner or group of communication partners, from the electronic device used by the user, and prior to the second communication partner or group of communication partners initiating a communication with the user.

21. A computer implemented method comprising:
an email service Provider receiving notification of use of a first and a second email address with first and second intended communication partners, the notifications received by the email service provider prior to the first and second communication partners initiating communication with a user;
the email service provider receiving emails addressed to the first and the second email address of the user, the first and second email addresses being separate and distinct from each other and having been provided by the email service provider to an electronic device of the user for the electronic device to facilitate communication between the user and a first intended communication partner using the first email address and to facilitate communication between the user and a second intended communication partner using the second email address; and
the email service provider organizing said received emails based at least in part on said first and second email addresses of the user, and respective intended versus unintended communication partners of said first email address of the user and respective intended versus unintended communication partners of said second email address of the user.

22. The method of claim 21, wherein the method further comprises providing said emails to the user, with the emails characterized by at least said first and second email addresses, and intended versus unintended communication partners of said first and second email addresses.

23. A method comprising:
providing notification or facilitating the provision of notification, from an electronic device of a user to an email service provider, of use of email addresses with intended communication partners, the notifications provided prior to the intended communication partners initiating communication with the user;
receiving emails by the electronic device of the user, from the email service provider, wherein the emails are characterized based at least in part on separate and distinct email addresses of the user, and intended versus unintended communication partners of each of said email addresses of the user, and the email addresses of the user are provided to the electronic device for the user by the email service provider; and
presenting by the electronic device said emails for viewing by the user, organized by at least said email addresses of the user and said intended versus unintended communication partners of said email addresses.

24. The method of claim 23, wherein the method further comprises the electronic device deleting all received emails addressed to the first or second email address not sent respectively by the intended communication partner of the first/second email address.

25. The method of claim 24, wherein said deletion is performed in response to user instruction.

26. The method of claim 25, wherein the method further comprises the electronic device providing the user with an end user interface feature to provide said user instruction with a single press of a key or control button.

27. An apparatus comprising:
a storage medium having stored therein a plurality of programming instructions designed to enable the apparatus, if the programming instructions are executed, to obtain respectively a first and a second separate and distinct email address from an email service provider in real time for a user, at the first and second distinct email addresses' respective initial selection for usage, after subscription of email server with the email service provider by the user, correspondingly earmarking said first and second distinct email addresses to facilitate respective communication between the user and a first and a second intended communication partner or group of communication partners, and organizing received emails based at least in part on intended versus unintended communication partners of said first and second distinct email addresses; and a processor coupled to the storage medium to execute the plurality of programming instructions.

28. The apparatus of claim 27, wherein the programming instructions, if executed, further enable the apparatus to notify of said employment of the first and second distinct email addresses to facilitate respective communication between the user and the first and second intended communication partner or group of communication partners.

29. The apparatus of claim 28, wherein the programming instructions, if executed, enable the apparatus to make said notifications integrally and respectively, when requesting for the first and second distinct email addresses from said email service provider.

30. The apparatus of claim 28, wherein the programming instructions, if executed, enable the apparatus to make each of said notifications after having been provided with the respective first and second distinct email addresses from said email service provider.

31. An apparatus comprising:
a storage medium having stored therein a plurality of programming instructions design to enable the apparatus, if the programming instructions are executed, to register a user as a service subscriber of the apparatus, and to provide together a collection of email addresses having at least a first and a second email address, said first and second email addresses being separate and distinct and being provided to an electronic device of the user for use by the electronic device to facilitate communication between the user and a first and a second communication partner or group of communication partners, the provision being made in advance of the first and second email addresses' initial selection for usage; and a processor coupled to the storage medium to execute the programming instructions.

32. The apparatus of claim 31, wherein the programming instructions, if executed, enable the apparatus to provide a plurality of distinct email addresses to the electronic device used by the user in advance of the first and second email addresses' initial selection for usage, for the electronic device to select said first and second separate and distinct email addresses.

33. The apparatus of claim 31, wherein the programming instructions, if executed, further enable the apparatus to receive notification of usage of said first email address with said first communication partner or group of communication partners, from the electronic device used by the user.

34. The apparatus of claim 31, wherein the programming instructions, if executed, enable the apparatus to receive notification of usage of said second email address with said second communication partner or group of communication partners from the electronic device used by the user.

35. An apparatus comprising:
a storage medium having stored therein a plurality of programming instructions designed to enable the apparatus, if the programming instructions are executed, to receive notification of use of a first and a second separate and distinct email address with first and second intended communication partners, the notifications received prior to the first and second communication partners initiating communication with a user, to receive emails addressed to the first and the second separate and distinct email address of the user, and to organize said received emails based at least in part on said first and second email addresses, and intended versus unintended communication partners of said first and second email addresses, wherein the first and second email addresses having been provided respectively by an email service provider to an electronic device of the user for the electronic device to facilitate respective communication between the user and a first and a second intended communication partner; and a processor coupled to the storage medium to execute the plurality of programming instructions.

36. The apparatus of claim 35, wherein the programming instructions, if executed, further enable the apparatus to provide said emails to the user, with the emails characterized by at least said first and second email addresses, and intended versus unintended communication partners of said first and second email addresses.

37. An apparatus comprising:
a storage medium having stored therein a plurality of programming instructions designed to enable the apparatus, if the programming instructions are executed, to provide notification or facilitate the provision of notification, to an email service provider, of use of email addresses with intended communication partners, the notifications provided prior to the intended communication partners initiating communication with a user, to receive emails of the user from the email service provider, the emails being characterized based at least in part on separate and distinct email addresses of the user, and intended versus unintended communication partners of each of said email addresses, and to present said emails for viewing by the user, organized by at least said email addresses of the user and said intended versus unintended communication partners of said email addresses, the email addresses of the user having been provided by the email service provider; and a processor coupled to the storage medium to execute the plurality of programming instructions.

38. The apparatus of claim 37, wherein the programming instructions, if executed, further enable the apparatus to delete all received emails addressed to the first or second email address not sent respectively by the intended communication partner(s) of the first or second email address.

39. The apparatus of claim 38, wherein the programming instructions, if executed, further enable the apparatus to perform said deletion in response to user instruction.

40. The apparatus of claim 39, wherein the programming instructions, if executed, further enable the apparatus to provide the user with an end user interface feature to provide said user instruction with a single press of a key or control button.

41. A system comprising:
a networking interface;
a storage medium coupled to the networking interface, and having stored therein a plurality of programming instructions designed to enable the system, if the programming instructions are executed, to register a user as a service subscriber of an email service, and to provide together a collection of email addresses having at least a first and a second email address, said first and second email addresses being separate and distinct and being provided to an electronic device of the user for use by the electronic device to facilitate respective communication between the user and a first communication partner or a first group of communication partners, and between the user and a second communication partner or group of communication partners, the provision being made in advance of the first and second email addresses' initial selection for usage; and a processor coupled to the storage medium and the networking interface to execute the programming instructions.

42. The system of claim 41, wherein the programming instructions, if executed, enable the system to provide a plurality of distinct email addresses to the electronic device used by the user for the electronic device to select said first and second separate and distinct email addresses for used by the user for said respective communications, the provision being made in advance of the first and second email addresses' selection for initial selection for usage.

43. The system of claim 41, wherein the programming instructions, if executed, further enable the system to receive notification of usage of said first and second email addresses with said respective first or second communication partner or group of communication partners, from the electronic device used by the user.

44. A computer readable medium comprising:
a storage medium; and
a plurality of programming instructions stored in the storage medium, the programming instructions designed to program a system, to enable the system, if the programming instructions are executed, to register a user as a service subscriber of an email service, and to provide at least a first and a second email address, that are separate and distinct, to an electronic device of the user for use by the electronic device to facilitate respective communication between the user and the first intended communication partner or a first intended group of communication partners, and between the user and a second intended communication partner or a second intended group of communication partners, the provision being made in real time respectively at the first and second email addresses' respective initial selection for usage after enrollment of the user as a service subscriber of the email service provider the first and second email addresses enabling differentiation of email received from intended versus unintended communication partners.

45. The computer readable medium of claim 44, wherein the programming instructions, if executed, enable the system to provide in real time respectively said first and second email addresses to the electronic device for use by the user, the provision being made in response respectively to a first and a second request, and the first and second requests being made at the first and second email addresses respective initial selection for usage.

46. The computer readable medium of claim 44, wherein the programming instructions, if executed, further enable the system to receive notification of respective usage of said first and second email addresses with said first and second communication partners or groups of communication partners, from the electronic device used by the user.

47. A computer implemented method, comprising:
receiving by a computing device, from an email service provider, a plurality of separate and distinct email addresses as a set of email addresses;
detecting by the computing device, a need for an email address to be employed for communication with a first intended communication partner or partners;
automatically selecting by the computing device, a first email address from among the plurality of separate and distinct email addresses and storing information relating the first email address to the first intended communication partner or partners;
detecting by the computing device, a need for an email address to be employed for communications with a second intended communication partner or partners; and
automatically selecting by the computing device, a second email address from among the plurality of separate and distinct email addresses and storing information relating the second email address to the second intended communication partner or partners;
wherein the first and second email addresses are received together as a collection of email addresses prior to the first and second intended communication partner or partners initiating communication with the computing device.

48. The method of claim 47, further comprising:
sending information, by the computing device, to the email service provider relating the first email address to the first intended communication partner or partners and the second email address to the second intended communication partner or partners.

49. The method of claim 47, further comprising:
receiving by the computing device, email that is addressed to the first and second email addresses, the email including email sent from the first and second intended communication partner or partners and email sent from other sources; and
providing by the computing device, a user interface that segregates the received email into email sent from the intended communication partner or partners and email sent from other sources.

50. The method of claim 49, further comprising:
segregating by the computing device, the received email via the user interface into different inboxes corresponding to each of the first and second email addresses, and, for each inbox, different folders corresponding to email respectively sent from an intended communication partner or partners associated with the corresponding email address and email sent from other sources to the corresponding email address associated with that inbox.

51. The method of claim 47, further comprising:
generating and sending by the computing device a request to the email service provider to return a set of email addresses including a plurality of distinct email addresses.

52. A computer readable medium, comprising:
a storage medium; and
a plurality of programming instructions stored in the storage medium that, if executed, enable a system to receive, from an email service provider, a plurality of separate and distinct email addresses as a set of email addresses; to detect a need for an email address to be employed for communication with a first intended communication partner or partners; to automatically select a first email address from among the plurality of separate and distinct email addresses and to store information relating the first email address to the first intended communication partner or partners; to detect a need for an email address to be employed for communications with a second intended communication partner or partners; and to automatically select a second email address from among the plurality of separate and distinct email addresses and to store information relating the second email address to the second intended communication partner or partners;

wherein the first and second email addresses are received together as a collection of email addresses prior to the first and second intended communication partner or partners initiating communication with the system.

53. The computer readable medium of claim 52, further comprising:

programming instructions that, if executed, enable the system to send information to the email service provider relating the first email address to the first intended communication partner or partners and the second email address to the second intended communication partner or partners.

54. The computer readable medium of claim 52, further comprising:

programming instructions that, if executed, enable the system to receive email that is addressed to the first and second email addresses, the email including email sent from the first and second intended communication partner or partners and email sent from other sources; and to provide a user interface that segregates the received email into email sent from the intended communication partner or partners and email sent from other sources.

55. The computer readable medium of claim 54, further comprising:

programming instructions that, if executed, enable the system to segregate the received email via the user interface into different inboxes corresponding to each of the first and second email addresses, and, for each inbox, different folders corresponding to email respectively sent from an intended communication partner or partners associated with the corresponding email address and email sent from other sources to the corresponding email address associated with that inbox.

56. The computer readable medium of claim 52, further comprising:

programming instructions that, if executed, enable the system to generate and send a request to the email service provider to return a set of email addresses including a plurality of distinct email addresses.

57. An apparatus comprising:

means for receiving from an email service provider a first email address and a second email address, separate and distinct from the first email address;

means for providing the first received email address for use to register a user with a first intended web site; and means for providing the second received email address for use to register the user with a second intended web site, wherein the first and second email addresses are received together as a collection of email addresses in advance of providing the first and second email addresses to the first and second intended web sites, wherein the means for providing the first and second email addresses comprises means for selecting the first and second email addresses from the collection of email addresses to facilitate communication with intended versus unintended communication partners.

58. The apparatus of claim 57, further comprising means for notifying the email service provider of usage of the first and second email addresses, including addresses of the first and the second web site.

59. An apparatus comprising:

means for receiving notification of use of a first and a second email address with first and second intended communication partners, the notifications received prior to the first and second communication partners initiating communication with a user;

means for receiving emails addressed to the first and the second email address of the user, the first and second email addresses being separate and distinct from each other and having been provided to facilitate communication between a user and a first intended communication partner using the first email address and to facilitate communication between the user and a second intended communication partner using the second email address; and means for organizing said received emails based at least in part on said first and second email addresses of the user, and respective intended versus unintended communication partners of said first email address of the user and respective intended versus unintended communication partners of said second email address of the user.

60. The apparatus of claim 59, further comprising means for providing said emails to the user, with the emails characterized by at least said first and second email addresses, and intended versus unintended communication partners of said first and second email addresses.

* * * * *

UNITED STATES PATENT AND TRADEMARK OFFICE
CERTIFICATE OF CORRECTION

PATENT NO. : 7,644,124 B1 Page 1 of 1
APPLICATION NO. : 09/504236
DATED : January 5, 2010
INVENTOR(S) : Swain W. Porter It is certified that error appears in the above-identified patent and that said Letters Patent is hereby corrected as shown below:

Column 10
Line 1, "A computer implemented...: ..." should read -- A computer-implemented...: ...--.

Column 10
Line 2, "...service Provider..." should read --...service provider...--.

Column 11
Line 2, "...email server..." should read --...email service...--.

Column 13
Lines 34-35, "...and the first intended communication partner..." should read --...and a first intended communication partner...--.

Column 13
Line 42, "...service provider the first..." should read --...service provider, the first...--.

Signed and Sealed this

Third Day of August, 2010

David J. Kappos
*Director of the United States Patent and Trademark Office*